United States Patent

Revis et al.

[11] Patent Number: 5,107,008
[45] Date of Patent: Apr. 21, 1992

[54] CURABLE FLUORESCENT ORGANOPOLYSILOXANE COMPOSITIONS

[75] Inventors: Anthony Revis, Freeland; Maris J. Ziemelis, Midland, both of Mich.

[73] Assignee: Dow Corning Corporation, Midland, Mich.

[21] Appl. No.: 517,864

[22] Filed: May 2, 1990

[51] Int. Cl.⁵ .................................................. C07F 7/10
[52] U.S. Cl. ...................................... 556/425; 556/413; 556/422; 549/214
[58] Field of Search .................. 556/413, 425, 422; 549/214

[56] References Cited

U.S. PATENT DOCUMENTS

| | | | |
|---|---|---|---|
| 3,427,273 | 2/1969 | Newing, Jr. | 260/30.4 |
| 4,250,382 | 9/1981 | Libby | 250/302 |
| 4,396,528 | 8/1983 | Abbott | 252/301.17 |
| 4,746,751 | 5/1988 | Oviatt et al. | 556/456 |
| 4,857,652 | 8/1989 | Schaap | 549/214 X |
| 4,866,152 | 9/1989 | Lo | 528/25 |
| 4,918,200 | 4/1990 | Arkles | 549/214 |

Primary Examiner—Paul F. Shaver
Attorney, Agent, or Firm—George A. Grindahl

[57] ABSTRACT

Fluorescent organopolysiloxane compounds which bear two or more reactive silicon-bonded sites are useful as durable markers in curable silicone compositions. Having more than one reactive site the compounds participate in the curing reaction of the curable composition and thus do not adversely affect its curing behavior. The resulting fluorescent curable compositions are particularly useful in the preparation of adhesive-release coatings.

10 Claims, No Drawings

CURABLE FLUORESCENT ORGANOPOLYSILOXANE COMPOSITIONS

BACKGROUND OF THE INVENTION

The present invention relates to curable fluorescent organopolysiloxane compositions and to reactive fluorescent compounds therefor. More particularly the present invention relates to silicone coatings which comprise new reactive fluorescent organopolysiloxane compounds that are durable markers in the cured silicone coatings.

Cured silicone coatings have been used for a long time in the manufacture of peelable backings for adhesive-bearing items, such as labels and tapes. An uncured silicone coating is generally applied to a substrate, such as paper or plastic film, as a thin (e.g. 0.5 micrometer) layer of a curable liquid composition and subsequently cured to a crosslinked film by the application of heat or radiation. The thus-coated backing is thereafter brought into releasable contact with an adhesive layer from which it is to be peeled.

Since the cured release coating is typically too thin and/or too transparent to be seen with the unaided eye it is difficult to determine which side of a coated backing bears the cured release coating and how continuous that coating is. Consequently, in the use of the peelable backing, there exists the possibility of bringing an uncoated, or improperly coated, surface of the backing into non-releasable contact with an adhesive layer. A method for detecting the presence and continuity of a silicone release coating on a backing, preferably during the formation of the peelable backing, would thus be beneficial. Furthermore, it is desirable to measure the amount of coating on a substrate so as to able to control the amount being applied on-line, i.e. during the production of the peelable backing, in an economical and effective manner.

The addition of visible colorants (pigments or dyes) to a curable silicone coating has been found to be generally unsatisfactory since the high levels of colorants needed to obtain visual differentiation can adversely effect the cure of the coating and/or the adhesive release properties of the cured coating. Additionally, a colored coating is sometimes aesthetically undesirable.

In another approach to the problem of coating application and detection, Libby, U.S. Pat. No. 4,250,382, claims a method for detecting a cured silicone coating on a paper substrate comprising adding a particulate fluorescent pigment to the silicone coating before the coating is applied, scanning the resulting cured coating with ultraviolet light and detecting the fluorescence. The particulate pigments are not soluble in the silicone coating and therefore must be dispersed with vigorous mechanical agitation. Patentee notes that the use of fluorescent dyes, in contrast to fluorescent pigments, in silicone resins is not suitable because the dyes inhibit the cure of the silicone and/or fail to fluoresce sufficiently in cured silicones and/or do not adequately disperse in silicone coating compositions. However, the use of particulate fluorescent pigments is less than satisfactory since a dispersed pigment can settle out of a liquid organopolysiloxane coating composition during storage, or even during shipping or application of the composition, necessitating additional effort and/or equipment for its redispersion.

U.S. Pat. No. 4,746,751 to Oviatt et al. relates to silane dye compounds which bear a fluorescent radical and one or more silicone polymer-reactive groups, such as vinyl or alkoxy, which are subsequently covalently bonded into a curable silicone composition during its cure. The fluorescent radical can be any fluorescent moiety selected from the group of polycyclic, homocyclic or heterocyclic aromatic compounds which demonstrate fluorescence, or the extinction of fluorescence upon a chemical event, e.g. the influence of molecular oxygen. The curable compositions are said to thus be useful as gas-permeable polymer compositions for unitary non-diffusible indicator elements in oxygen-detecting fiber optic biological probes. Fluorescent organopolysiloxane compounds which contain two or more reactive radicals are not suggested as reactive components in the compositions of Oviatt et al.

Dansyl-based silicon compounds are known from U.S. Pat. No. 4,396,528 to Abbott which discloses a fluorescent inert porous particulate material which is useful for detecting radioactive substances during thin-layer chromatography. The material is prepared by reacting a coupling agent, such as $H_2NCH_2CH_2NHCH_2CH_2CH_2Si(OCH_3)_3$ or $HSCH_2CH_2CH_2Si(OCH_3)_3$ with an aqueous slurry of silica, followed by reaction with a reactive fluorescent material, such as dansyl chloride or dansyl aziridine. However, the inert particles of Abbott do not contain reactive groups, such as silicon-bonded hydrogen atoms or alkenyl radicals.

U.S. Pat. No. 4,866,152 to Lo relates to fluorescent silanes and polysiloxanes for use as optical brighteners. These fluorescent materials are prepared by a process comprising contacting an aminofunctional silicon compound with certain optical brightening agents which are, specifically, fluorescent sulfonic acids (to form a sulfonamide linkage) or fluorescent aldehydes (to form an imino linkage) and recovering the desired fluorescent organosilicon compound. Also claimed are the fluorescent organosilicon compounds, a laundry detergent or a hair dye containing the fluorescent organosilicon compounds, a fluorescent elastomeric film derived from reacting the fluorescent organosilicon compounds with a polyfunctional acrylate, a fluorescent tack-free resinous film derived from exposing the fluorescent organosilicon compounds to moisture and a quality assurance test method for indicating the extensiveness of a silicone treatment on a substrate comprising treating the substrate with the fluorescent organosilicon compounds and examining the treated substrate under ultraviolet light. While the treatment of paper to achieve whitening is suggested Patentee makes no suggestion of fluorescent adhesive release coating compositions.

BRIEF SUMMARY OF THE INVENTION

It is an object of the present invention to provide new organopolysiloxane compounds and compositions which fluoresce when exposed to ultraviolet light. It is another object of this invention to provide fluorescent organopolysiloxane compounds which can be reacted with a curable organopolysiloxane coating composition without adversly effecting the curing of the coating composition. It is a particular object of this invention to provide addition-curing adhesive release compositions which can be detected on a substrate by way of fluorescence under ultraviolet light.

These objects, and others which will become apparent to one of ordinary skill in the silicone coatings art, are obtained by the present invention which, briefly stated, comprises providing a multiply reactive fluorescent organopolysiloxane compound which can be used as a curing component in a curable coating composition. The present invention further comprises mixing this multiply reactive fluorescent organopolysiloxane compound with a curable organopolysiloxane coating composition in an amount which is sufficient to provide at least a detectable amount of fluorescent radiation from a thin layer of the coating when it is exposed to ultraviolet light. In a preferred embodiment of the present invention a dansyl radical-containing organopolysiloxane bearing two or more silicon-bonded reactive sites is incorporated as a curing component into an addition-curable adhesive-release coating.

DETAILED DESCRIPTION OF THE INVENTION

The present invention relates to an organopolysiloxane compound having the empirical formula

at each occurrence,
  R denotes a silicon-bonded monovalent hydrocarbon or halogenated hydrocarbon radical free of aliphatic unsaturation,
  X denotes a silicon-bonded reactive site selected from the group consisting of the hydrogen atom and olefinic hydrocarbon radicals,
  L denotes a silicon-bonded monovalent organic radical containing a fluorescent nucleus, and
  Z denotes a silicon-bonded hydrolyzable radical, there being an average of at least two X reactive sites and at least one L radical per molecule of said compound and the sum of the subscripts a+b+c+d has a value of from one to 2.67.

In the empirical formula immediately above R denotes any silicon-bonded monovalent hydrocarbon or halogenated hydrocarbon radical which contains no aliphatic unsaturation and which has, preferably, no more than 20 carbon atoms, and most preferably from 1 to 6 carbon atoms.

Examples of monovalent hydrocarbon radicals which are encompassed by R include alkyl radicals, such as methyl, ethyl, and the straight- and branched-chain forms of propyl, hexyl, octyl, decyl and octadecyl; cycloaliphatic radicals, such as cyclohexyl; and radicals bearing an aromatic nucleus, such as phenyl, tolyl, benzyl, phenylethyl and xylyl.

Examples of halogenated hydrocarbon radicals encompassed by R include any of the hydrocarbon radicals encompassed above wherein one or more hydrogen atoms have been replaced with a halogen atom, preferably chlorine or fluorine. It is preferred that aliphatic carbon atoms of the halogenated hydrocarbon radicals which are directly bonded to, or one carbon atom removed from, a silicon atom not contain a halogen atom.

The R radicals are preferably selected from the group of commercially used radicals such as methyl, phenyl and perfluoroalkylethyl having the formula $CF_3(CF_2)_nCH_2CH_2-$ wherein n has a value of 0 or more, preferably 0 to 10, and most preferably 0 to 4. Typically, R radicals comprise a majority of the silicon-bonded radicals, exclusive of divalent oxygen linking silicon atoms, in the organopolysiloxane compounds of this invention.

When the organopolysiloxane compound is to be incorporated into an organic pressure sensitive adhesive-release coating composition the methyl radical constitutes at least 90 mol percent, and preferably at least 95 mol percent, of all R radicals of the compounds of this invention. When the organopolysiloxane compound is to be incorporated into a silicone pressure sensitive adhesive-release coating composition the perfluoroalkylethyl having the formula $CF_3(CF_2)_nCH_2CH_2-$, noted above, constitutes 5–50 mol percent, preferably 10–25 mol percent, of all R radicals.

Each X in the above empirical formula denotes, independently, any silicon-bonded reactive site selected from the group consisting of the hydrogen atom and olefinic hydrocarbon radicals. Examples of olefinic hydrocarbon radicals encompassed by X include vinyl and the straight- or branched-chain forms of allyl, butenyl, pentenyl, hexenyl and octenyl. It is preferred that at least two, and most preferably all, of the olefinic hydrocarbon radicals contain at least one $CH_2=CH-$ radical. X is preferably selected from the group of commercially used reactive sites such as hydrogen, vinyl and 5-hexenyl.

The organopolysiloxane compounds of this invention must contain at least two, and preferably contain more than two, X radicals in order to be useful as a reactive component in an addition-curing composition without substantially adversely affecting the cure of the composition. That is to say, when X is hydrogen there must be at least a sufficient number thereof in the molecule to act as a curing component, either solely or in concert with other organohydrogenpolysiloxanes, with the olefinic radical-containing components of the addition-curing composition. Alternatively, when X is an olefinic radical there must be at least a sufficient number thereof in the molecule to act as a curing component, either solely or in concert with other olefinic radical-containing organopolysiloxanes, with the organohydrogenpolysiloxane components of the addition-curing composition.

Each L in the above formula denotes, independently, any silicon-bonded monovalent organic radical containing a fluorescent nucleus. Although the present invention has been demonstrated with organopolysiloxane compounds wherein L denotes an SiC-bonded organic radical bearing a dansyl or methylcoumarin nucleus it is believed that L can be any monovalent organic radical which has been derived from a fluorescent compound and thus has a fluorescent nucleus. For maximum hydrolytic stability it is preferred that L be bonded to Si by a silicon-carbon bond.

It is preferred that L contain a dansyl nucleus since this nucleus provides preferred fluorescence for the organopolysiloxane compounds and compositions of this invention when exposed to ultraviolet light. The dansyl-containing radicals provide a fluorescence, when exposed ultraviolet light, which is different, and detectable apart, from the fluorescence that is produced by the paper-whitening components used in the paper industry.

By the expression "dansyl nucleus" it is meant herein the residue bonded to the chlorine atom in the compound 5-dimethylaminonaphthalene-1-sulfonyl chloride, i.e., dansyl cloride. A dansyl nucleus has the formula $-SO_2C_{10}H_6N(CH_3)_2$ and is bonded at its sulfur atom.

By the expression "methylcoumarin nucleus" it is meant herein the residue bonded to the hydroxyl group of 4-methyl-7-hydroxycoumarin. A methylcoumarin nucleus has the formula $-C_{10}H_7O_2$ and is bonded by way of a carbon atom.

In the preferred embodiments of this invention the monovalent organic radical bearing a dansyl or methylcoumarin nucleus is bonded to a silicon atom by way of a divalent organic linking radical, one terminus of which is a carbon atom bonded to the silicon atom and the other terminus of which is an oxygen atom bonded to the methylcoumarin nucleus or a nitrogen atom bonded to the dansyl nucleus.

Examples of these divalent organic linking radicals include, but are not limited to, radicals having the formulae $-R^1(NHR^1)_gNR^3-$ and $-R^1(R^1O)_gO-$ in which $R^1$ is a divalent hydrocarbon radical, $R^3$ is hydrogen or an alkyl radical having 1 to 6 carbon atoms and the subscript g has a value of 0 to 4. It is to understood that polyamino linking radicals wherein g exceeds 0 may contain more than one dansyl nucleus.

In preferred embodiments of this invention, the linking group is $-R^1NH-$ or $-R^1O-$. In these embodiments $R^1$ is a divalent hydrocarbon group having from 3 to 6 carbon atoms such as trimethylene, tetramethylene or isobutylene. Preferably, $R^1$ is trimethylene or isobutylene. Examples are $-CH_2CH_2CH_2NH-$, $-CH_2CH_2CH_2O-$, $-CH_2CH(CH_3)$ $CH_2N(CH_3)-$, $-CH_2CH(CH_3)CH_2NH-$, $-CH_2CH_2CH_2N(CH_3)-$ and $-CH_2CH(CH_3)CH_2O-$.

In the above empirical formula each Z denotes, independently, any silicon-bonded hydrolyzable radical. Examples of hydrolyzable radicals suitable for use as Z include halogen, such as chlorine; hydroxy; alkoxy, such as methoxy, ethoxy and propoxy; acyloxy, such as acetoxy; acylamino, such as acetamido; and ketoximo, such as methylketoximo.

It is within the scope and spirit of this invention that the claimed organopolysiloxane compounds can further contain trace amounts of silicon-bonded radicals which arise from intermediates that are used in the preparation of the compounds of this invention. For example, trace amounts of amine-containing radicals may remain unreacted after a dansyl-containing compound, such as dansyl chloride, is used to introduce the dansyl nucleus into an aminoalkyl-substituted organosilicon compound. In like manner, chloroalkyl radicals may remain unreacted after a methylcoumarin-containing compound, such as 4-methyl-7-hydroxycoumarin is used to introduce the methylcoumarin nucleus into a chloroalkyl-substituted organosilicon compound.

The subscripts a and d in the above formula have values of from zero to two, both inclusive; such as 0.1, 0.5, 1, 1.5 and 1.9. The subscripts b and c in the above formula have values of from more than zero to one, both inclusive; such as 0.1, 0.5, and 0.9. The sum of the subscripts $a+b+c+d$ in the above formula has a value of from 1 to 2.67, thereby providing organopolysiloxanes which can have any molecular structure such as linear, cyclic, branched and network siloxane structures.

The organopolysiloxane compounds of this invention comprise three or more siloxane units selected from terminating units, such as $R_3SiO_{1/2}$, $LR_2SiO_{1/2}$, $XR_2SiO_{1/2}$, $ZR_2SiO_{1/2}$, $LXRSiO_{1/2}$ and $Z_2RSiO_{1/2}$; linear units, such as $R_2SiO_{2/2}$, $LRSiO_{2/2}$, $XRSiO_{2/2}$ and $XLSiO_{2/2}$; and branching units, such as $RSiO_{3/2}$, $LSiO_{3/2}$, $XSiO_{3/2}$ and $SiO_{4/2}$.

The compounds of this invention preferably have the linear formula $YMe_2SiO(Me_2SiO)_x(MeLSiO)_y(MeXSiO)_zSiMe_2Y$. In this formula each Y denotes, independently, a radical selected from the group consisting of R, X, L and Z radicals, noted above, including preferred embodiments. Me is methyl.

For example, both Y radicals can be R, such as Me, in which case the value of y must be at least one and the value of z must be at least two in order to provide the required number of L radicals and X reaction sites. Alternatively, both Y radicals can be either L radicals or X radicals thereby permitting, but not requiring, the value of y or z, respectively, to be zero.

The average values of x, y and z can be zero or more with the stated proviso that the organopolysiloxane contains at least one L radical and at least two X reactive sites. The value of x typically ranges from 0–3,000, preferably from 10–1000 and most preferably from 50–500. The values of y and z preferably range from 0-100 and most preferably from 0–10.

The sum of $x+y+z$ must have a value of one or more. There is no known upper limit for the sum of $x+y+x$; its desired value will depend upon the use to which the organopolysiloxane compound is applied. However, for most applications, it is desired that the organopolysiloxane compound be a liquid, and preferably a flowable liquid, and an upper value of 3,000, preferably 500, and most preferably, about 100 is appropriate. The organopolysiloxane compounds of this invention can have a viscosity ranging up to 100 million, most preferably from 10 to 10 thousand and, for coating applications, from 100–1,000 cP (centipoise) at 25° C.

Examples of preferred linear organopolysiloxane compounds of this invention include, but are not limited to,

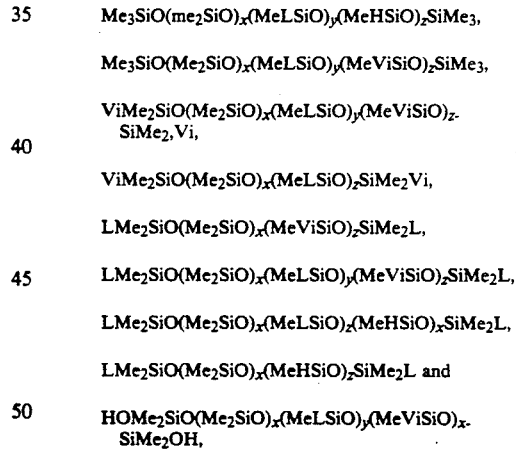

wherein x, y and z have values at least sufficient to provide the required number of fluorescent radicals and reactive sites.

The organopolysiloxane compounds of this invention can be prepared by adapting known organosilicon synthesis methods for preparing fluorescent radical-containing organopolysiloxane to also incorporate reactive sites. For example, U.S. Pat. Nos. 2,950,986; 3,427,273; 3,741,932; 4,396,528; 4,746,751; and 4,866,152; and copending and coassigned application for U.S. Patent entitled "FLUORESCENT ORGANOSILICON SILICON COMPOUNDS AND METHODS", filed on even date herewith, are incorporated herein by reference to show various fluorescent nuclei and how to introduce those nuclei into silane and/or siloxane precursors for the preparation of the compounds of this invention. Once having read this disclosure, and the teachings of the incorporated patents, one of ordinary skill in the organosilicon arts will be able to synthesize numerous compounds which contain one or more fluorescent radicals and two or more reaction sites for an addition cure, and will thus be within the scope and spirit of the present invention.

As disclosed above, preferred compounds of this invention contain a dansyl or a methylcoumarin nucleus. The dansyl-containing compounds of this invention can be readily produced, for example, by the reaction of an aminofunctional silane or siloxane with a dansyl-containing labeling agent such as 5-dimethylaminonaphthalene-1-sulfonyl chloride, known as dansyl chloride; followed by the introduction of silicon-bonded reactive sites, if more are needed, by standard siloxane synthesis methods. The methylcoumarin-containing compounds of this invention can be readily produced, for example, by the reaction of 4-methyl-7-hydroxycoumarin with an aliphatic halide; followed by the introduction of silicon-bonded reactive sites, if more are needed, by standard siloxane synthesis methods.

The reaction of one equivalent of dansyl chloride with one equivalent of an aminofunctional silicon compound can be represented by the following general reaction scheme.

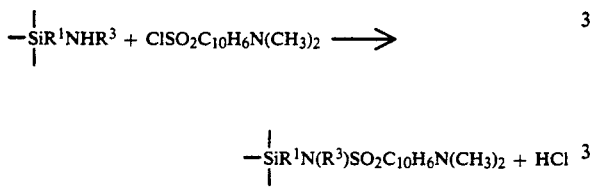

The reaction of two equivalents of dansyl chloride with one equivalent of an diaminofunctional silicon compound can be represented by the following general reaction scheme.

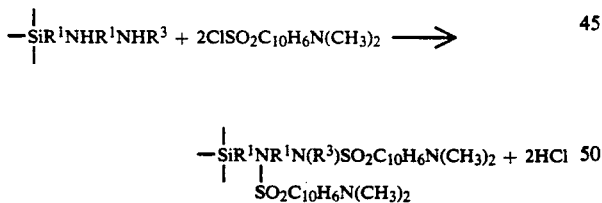

The reaction of one equivalent of 4-methyl-7-hydroxycoumarin with one equivalent of aliphatic halide silicon compound can be represented by the following general reaction scheme.

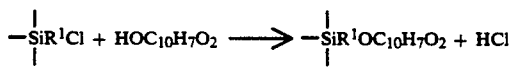

As noted above, the organopolysiloxane compounds of this invention are useful as durable markers in addition-curing silicone coating compositions. These compounds can be used either as an additives in an addition-curable silicone composition or they can be used, along with typical coreactants, to formulate addition-curable compositions.

Thus, the present invention further relates to a curable composition comprising
(A) an organopolysiloxane compound having the empirical formula $R_aX_bL_cZ_dSiO_{(4-a-b-c-d)/2}$ wherein, at each occurrence,
R denotes a silicon-bonded monovalent hydrocarbon or halogenated hydrocarbon radical free of aliphatic unsaturation,
X denotes a silicon-bonded reactive site selected from the group consisting of the hydrogen atom and olefinic hydrocarbon radicals,
L denotes a silicon-bonded monovalent organic radical containing a fluorescent nucleus,
Z denotes a silicon-bonded hydrolyzable radical, there being an average of at least two X reactive sites and at least one L radical per molecule of said compound and the sum of the subscripts $a+b+c+d$ has a value of from one to 2.67; and
(B) at least one component selected from the group consisting of
(i) a hydrosilylation catalyst
(ii) an inhibitor for the hydrosilylation catalyst, and
(iii) an organopolysiloxane bearing at least two silicon-bonded radicals which are reactive, by way of an hydrosilylation reaction, with the silicon-bonded reactive radicals of component (A).

In the curable compositions of this invention the fluorescent organopolysiloxane compound (A) can be any of the organopolysiloxane compounds of this invention, including preferred embodiments, herein delineated. In addition, Component (A) can further comprise organopolysiloxane compounds which do not contain L radicals but do contain the same type of X radicals as those present in the fluorescent organopolysiloxane.

Component (B) of the curable compositions of this invention comprises one or more of the well-known coreactants that are used in addition-curing silicone compositions. By addition-curing it is meant a reaction which comprises an hydrosilylation reaction which leads to an increase in viscosity of the composition. Typically, the addition-curing composition is converted from the liquid or flowable state to the solid state or non-flowable state by this reaction. For adhesive-release coatings the addition-curing composition is sufficiently cured to provide nil migration, nil smear and nil rub-off, as further defined below. Hydrosilylation is represented generically by the following scheme.

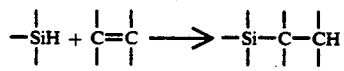

Component (B) is selected from the group of well-known addition-curing coreactants selected from the group consisting of (i) a hydrosilylation catalyst, (ii) an inhibitor for the hydrosilylation catalyst, and (iii) an organopolysiloxane bearing at least two silicon-bonded radicals which are reactive, by way of an hydrosilylation reaction, with the silicon-bonded reactive radicals of component (A).

For example, when component (B) comprises components (i) and (iii) the resulting compositions of this invention are spontaneously curable room temperature.

With the presence of component (i), (ii) and (iii) the composition is curable at room temperature after an induction period or spontaneously curable at elevated temperatures.

Alternatively, curable compositions of this invention which comprise component (B)(i), with or without component (B)(ii) are not curable until component (B)(iii) is added thereto. It is within the scope and spirit of this invention to prepare the compositions of this invention by mixing two or more non-curing compositions comprising components (A) and (B) in the well-known manner.

Hydrosilylation catalyst component (i) can be any of the peroxide- or platinum group metal-containing materials which catalyze the reaction of silicon-bonded hydrogen atoms with silicon-bonded olefinic hydrocarbon radicals.

Component (i) is preferably a platinum- or rhodium-containing material which is used in addition-curing silicone coating compositions. Examples thereof include, but are not limited to, chloroplatinic acid and its compounds and complexes, and rhodium trichloride and its compounds and complexes. U.S. Pat. No. 2,823,218 to Speier; U.S. Pat. No. 3,419,593 to Willing; U.S. Pat. No. 3,220,972 to Lamoreaux; U.S. Pat. No. 3,814,730 to Karstedt; U.S. Pat. No. 3,159,601 to Ashby; U.S. Pat. No. 3,516,946 to Modic; U.S. Pat. No. 3,775.452 to Karstedt; U.S. Pat. No. 3,296,291 to Chalk; U.S. Pat. Nos. 3,890,359; 3,928,629; 3,960,810; to Chandra et al. and U.S. Pat. No. 4,123,604 to Sandford, Jr. are incorporated herein by reference to teach platinum group metal-containing catalyst that are suitable for use as component (i) in the curable compositions of this invention.

Component (i) is most preferably a platinum-containing catalyst component since they are most widely used and available and because they provide a more favorable effect for the compositions of this invention in terms of pot life and cure time, as hereinafter discussed. A preferred platinum-containing catalyst component in the compositions of this invention is a form of chloroplatinic acid, either as the commonly available hexahydrate form or as the anhydrous form, because of its easy dispersibility in organosilicon systems.

A particularly useful catalyst is the composition obtained when chloroplatinic acid is reacted with an aliphatically unsaturated organosilicon compound such as divinyltetramethyldisiloxane, as disclosed by U.S. Pat. No. 3,419,593 hereinabove incorporated.

The amount of platinum group metal-containing catalyst component that is used in the compositions of this invention is not narrowly limited as long as there is a sufficient amount to accelerate a room temperature reaction between the silicon-bonded hydrogen atoms and the silicon-bonded olefinic hydrocarbon radicals of the reactive component. The exact necessary amount of said catalyst component will depend upon the particular catalyst and is not easily predictable. However, for chloroplatinic acid said amount can be as low as one part by weight of platinum for every one million parts by weight of organosilicon components. Preferably said amount is at least 10 parts by weight, on the same basis.

Inhibitor component (ii) can be any of the materials that inhibit the catalytic activity of the platinum group metal-containing catalyst at room temperature but not at elevated temperature.

Inhibitors for the platinum group metal-containing catalysts are well known in the organosilicon art. Examples of various classes of such metal catalyst inhibitors include unsaturated organic compounds such as ethylenically or aromatically unsaturated amides, U.S. Pat. No. 4,337,332, acetylenic compounds, U.S. Pat. Nos. 3,445,420 and 4,347,346, ethylenically unsaturated isocyanates, U.S. Pat. No. 3,882,083, olefinic siloxanes, U.S. Pat. No. 3,989,667, unsaturated hydrocarbon diesters, U.S. Pat. Nos. 4,256,870; 4,476,166 and 4,562,096, and conjugated ene-ynes, U.S. Pat. Nos. 4,465,818 and 4,472,563; other organic compounds such as hydroperoxides, U.S. Pat. No. 4,061,609; ketones, U.S. Pat. No. 3,418,731; sulfoxides, amines, phosphines, phosphites, nitriles, U.S. Pat. No. 3,344,111; diaziridines, U.S. Pat. No. 4,043,977; and various salts, such as U.S. Pat. No. 3,461,185. U.S. Pat. No. 4,262,107, discloses inhibitor blends in rhodium system. These U.S. patents are incorporated herein by reference to teach inhibitors for platinum group metal-containing catalyst that are suitable for use as component (ii) in the curable compositions of this invention.

The amount of inhibitor component (ii) to include in the curable compositions of this invention is not critical and can be any amount that will provide the desired inhibition, if any, of the hydrosilylation curing reaction at room temperature, but not so much as to prevent said curing reaction at useful elevated temperature. To determine an optimum amount of inhibitor the routineer may simply add an arbitrary amount thereof, such as from 0.1 to 10 percent by weight, based on the weight of the curable components in the composition, observe the effect of such an amount on the curing behavior of the composition and adjust the amount of inhibitor in the next composition as desired. Generally, the degree of inhibition is directly related to the amount of inhibitor present in the composition.

Component (iii) can be any organopolysiloxane bearing at least two silicon-bonded radicals which are reactive, by way of an hydrosilylation reaction, with the silicon-bonded reactive radicals of component (A). If component (A) bears silicon-bonded hydrogen atoms component (iii) must bear silicon-bonded olefinic hydrocarbon radicals, as delineated above, and vice versa. Component (iii) can also bear silicon-bonded fluorescent radicals, delineated above, if desired.

Organopolysiloxanes suitable for use as component (iii) have the empirical formula noted above for component (A) with the proviso that the subscript c can have a value of zero, in addition to the stated values for component (A).

Organopolysiloxane component (iii) which contains silicon-bonded hydrogen atoms preferably has a viscosity at 25° C. of from 1 to 1000 cP. In terms of preferred monovalent hydrocarbon radicals, noted above, examples of organohydrogenpolysiloxane which are suitable as component (iii) for the compositions of this invention include

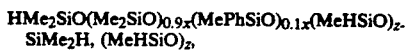

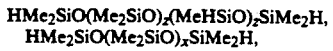

Organopolysiloxane component (iii) containing olefinic hydrocarbon reactive sites has a viscosity at 25° C. of from 100 cP to 100 million cP and more. In terms of preferred monovalent hydrocarbon radicals, noted above, examples of linear organopolysiloxanes of the above formula which are suitable as component (iii) for the composition of this invention include PhMeViSiO(-Me$_2$SiO)$_x$SiPhMeVi, Me$_3$SiO(Me$_2$SiO)$_x$(MeViSiO)$_x$-SiMe$_3$, ViMe$_2$SiO(Me$_2$SiO)$_x$SiMe$_2$Vi PhMeViSiO(-Me$_2$SiO)$_{0.8x}$(MePhSiO)$_{0.1x}$(Ph$_2$SiO)$_{0.1x}$SiPhMeVi, HOMe$_2$SiO(Me$_2$SiO)$_x$(MeViSiO)$_z$SiMe$_2$OH and ViMe$_2$SiO(Me$_2$SiO)$_x$(MeViSiO)$_z$SiMe$_2$Vi and wherein Me, Vi and Ph denote methyl, vinyl and phenyl, respectively. The values of the subscripts x and z can be zero or greater; however, the sum of x plus z has a value of up to about 3,000.

Organopolysiloxanes are, of course, well known in the organosilicon art. They are typically prepared by way of hydrolysis and condensation of hydrolyzable silanes such as XMe$_2$SiCl, XMeSiCl$_2$, XSiCl$_3$, Me$_2$SiCl$_2$, Me$_3$SiCl, MeSiCl$_3$, SiCl$_4$, Me$_2$Si(OMe)$_2$, MeSi(OMe)$_3$ and Si(OCH$_2$CH$_3$)$_4$ or by way of acid- or alkali-catalyzed siloxane equilibration of suitable siloxane precursors such as (Me$_2$SiO)$_4$, Me$_3$SiOSiMe$_3$, (MeXSiO)$_4$ and XMe$_2$SiOSiMe$_2$X which themselves are prepared by way of said hydrolysis and condensation reaction. Organohydrogenpolysiloxane are preferably prepared under non-alkaline conditions.

The amounts of organopolysiloxane components to be used in the compositions of this invention are substantially the same as the amounts used in addition-curable organopolysiloxane compositions of the art. Typically, the amounts of organohydrogenpolysiloxane and olefin-containing organopolysiloxane components to be used are expressed in terms of the mol ratio of silicon-bonded hydrogen atoms to silicon-bonded olefin radicals. This ratio has a value of from about 0.1/1 to 10/1, preferably 0.5/1 to 5/1 and most preferable 1/1 to 4/1.

The amount of fluorescent organopolysiloxane compound to be used in the compositions is not critical, as long as there is as sufficient amount to permit its fluorescence to be detected in a useful manner, such as for detecting the presence of, and/or measuring the amount of, the composition.

While the organopolysiloxane components of the compositions of this invention can all contain fluorescent radicals, it is only necessary for a portion of the olefin radical-containing organopolysiloxane component or the organohydrogenpolysiloxane component to contain fluorescent radicals.

For dansyl radical-containing organopolysiloxane compounds it is preferred that a minor amount, such as from 1-49 weight percent, be used in combination with a major amount, such as from 51-99 weight percent, of an. organopolysiloxane which contains the same type of reactive sites, but is free of dansyl radicals; both percentages being based of the total amount of organopolysiloxane which contains the same type of reactive sites, i.e., either hydrogen atoms of olefin radicals. For example, an organopolysiloxane composition of this invention comprises from 1-49 parts by weight of an organopolysiloxane bearing dansyl radicals and vinyl reactive sites and an amount of a dansyl radical-free organopolysiloxane bearing vinyl reactive sites sufficient to provide 100 parts by weight of organopolysiloxanes bearing vinyl reactive sites.

The curable compositions of this invention can further comprise optional components, such as diluents, solvents, fillers, cure-control additives, adhesive-release additives, surfactants and wet-out additives, which are well known in the silicone coatings art, and particularly in the adhesive-release coatings art.

The curable compositions of this invention can be prepared by any suitable method. For example, a method for preparing a fluorescent organopolysiloxane composition comprises mixing (A) an amount of an organopolysiloxane compound having the empirical formula R$_a$X$_b$L$_c$Z$_d$SiO$_{(4-a-b-c-d)/2}$ wherein, at each occurrence, R denotes a silicon-bonded monovalent hydrocarbon or halogenated hydrocarbon radical free of aliphatic unsaturation, X denotes a silicon-bonded reactive site selected from the group consisting of the hydrogen atom and olefinic hydrocarbon radicals, L denotes a silicon-bonded monovalent organic radical containing a fluorescent nucleus, Z denotes a silicon-bonded hydrolyzable radical, there being an average of at least two X reactive sites and at least one L radical per molecule of said compound and the sum of the subscripts a+b+c+d has a value of from one to 2.67; and (B) a curable mixture of components comprising an organohydrogenpolysiloxane and a olefin-substituted organopolysiloxane; said amount of component (A) being sufficient to cause the mixture of (A) and (B) to fluoresce to a detectable amount when exposed to ultraviolet light. It may be desirable to also add additional component (iii) in order to maintain the original reaction stoichiometry of the composition of the art.

Alternatively, an organopolysiloxane compound of this invention can be mixed with component (B) in the manner noted above to provide a curable composition of this invention.

When preparing a curable composition of this invention it is preferred to bring together component (i) and the SiH-containing components in a final mixing step just before the composition is to be used.

The curable compositions of this invention have substantially all of the utilities possessed by addition-curable silicone compositions of the art which do not contain an organopolysiloxane compound bearing at least two silicon-bonded reactive site selected from the group consisting of the hydrogen atom and olefinic hydrocarbon radicals and at least one silicon-bonded monovalent organic radical containing a fluorescent nucleus.

The curable compositions of this invention are particularly useful in coating processes wherein a thin layer of curable composition is applied to a substrate and thereafter cured. The fluorescent behavior of said composition allows for the qualitative detection and, with proper calibration of the composition-substrate combination and the use of well-known fluorescence measuring methods, the quantitative detection and application control of the coating. Thus a solution to a major problem in the silicone coatings art has been provided by the present invention.

The following examples are disclosed to illustrate, but not to limit, the present invention which is delineated by the appended claims. All parts and percentages are by weight, unless otherwise specified, and all temperatures are degrees Celsius. Me and Vi denote, respectively, methyl and vinyl.

EXAMPLE 1

Exactly 35.2 g of 7-hydroxy-4-methylcoumarin was dissolved in 300 ml of methanol containing 11.2 g of KOH and 1.0 g of KI. Allylbromide, 24.2 g, was added and the mixture was refluxed for 5 hrs. The reaction mixture was then mixed with water and extracted with diethyl ether and the ether extract was concentrated and 40.3 g (93%) of 7-allyloxy-4-methylcoumarin was recovered by recrystallization from methanol. The $^1$H-NMR spectrum (ppm) contained signals at 2.4(s) for $CH_3$; 4.6(d) for $CH_2O$; 5.5(d) for $C=CH_2$; and 5.3(m) for $CH=C$.

To a solution of 2.16 g of 7-allyloxy-4-methylcoumarin and $5 \times 10^{-6}$ mols chloroplatinic acid hydrosilylation catalyst in 20 ml toluene was slowly added 2.0 g of $Me_2SiHCl$ and the mixture was heated at 40°–42° for 6 hrs. Toluene and unreacted silane were then removed at reduced pressure to yield 7{2-(chlorodimethylsilyl)-propoxy}-4-methylcoumarin. The $^1$H-NMR spectrum (ppm) contained signals at 0.2(s) for $SiCH_3$, (6H); 2.4(s) for $CH_3$,(3H); 4.0(t) for $CH_2O$, (2H) and no signal for the allyl moiety.

To a mixture of $Me_2SiCl_2$, 17 g (130 mmols), and 2.5 g (8 mmols) of 7{2-(chlorodimethylsilyl)propoxy}-4-methylcoumarin was added 25 ml of water to cohydrolyze the chlorosilanes. The hydrolyzate was dissolved in toluene and the solution was washed with aqueous $NaHCO_3$. The toluene fraction was then dried by way of the toluene-water azeotrope, followed by removal of the remaining toluene. A viscous oil was obtained which had the average formula $LMe_2SiO(Me_2SiO)_{17}SiMe_2L$, where L denotes the 3-(4-methylcoumarinoxy)propyl radical, and an $^1$H-NMR spectrum (ppm) which contained signals at 0.2(s) for $SiCH_3$, (21H); and 2.4(s) for $CH_3$, (6H).

The oil having the formula $LMe_2SiO(Me_2SiO)_{17}SiMe_2L$, 2.0 g (1.2 mmols), was mixed with $(MeHSiO)_x$, 3.6 g (60 mmols), and 0.1 g $CF_3SO_3H$ and the mixture was heated for 4 hrs at 80°. The reaction mixture was then neutralized with $NaHCO_3$, the neutralized mixture was extracted with toluene and the extractant was concentrated to give a red oil of this invention having the average formula $LMe_2SiO(Me_2SiO)_{17}$,-$(MeHSiO)_{54}SiMe_2L$, where L denotes the 3-methylcoumarinoxypropyl radical.

EXAMPLE 2

A coating composition of this invention was prepared by mixing 0.38 g of $LMe_2SiO(Me_2SiO)_{17}(MeHSiO)_{54}SiMe_2L$ from Example 1 with 10.01 g of an adhesive release coating composition which cures to an adhesive release coating when mixed with an organohydrogenpolysiloxane and heated, and which contained a vinyl-terminated dimethyl-co-methylvinyl polysiloxane containing 1.5 mol% vinyl radicals, a platinum-containing curing catalyst and a platinum catalyst inhibitor which is effective at room temperature but not at elevated temperature. The resulting coating composition of this invention was applied to 37 lb Nicolet supercalendered kraft paper using a laboratory trailing blade coater adjusted to 30 psi blade pressure. The coated paper was heated in a forced air oven for 60 sec at 182° to fully cure the coating. The cured coating exhibited a light blue fluorescence when exposed to and viewed under black light.

The coated paper was coated with a solution of acrylic pressure sensitive adhesive, the solution was dried and the dried adhesive was brought into contact with a matte litho label stock to provide a releaseable laminate. The laminate was aged for 20 hrs at room temperature and the aged laminate was prepared for adhesive release testing, using ASTM methods. When pulled apart at a speed of 400 in/min a release force of 35 g/in was recorded. A comparison laminate, prepared identically as the laminate of this invention except using an equivalent amount of a methylhydrogenpolysiloxane in place of the $LMe_2SiO(Me_2SiO)_{17}(MeHSiO)_{54}SiMe_2L$, exhibited the same release force.

This example demonstrates the utility of the compositions of this invention as a fluorescing adhesive release coating which provides undiminished adhesive releasing ability.

EXAMPLE 3

A mixture of 17.6 g of 7-hydroxy-4-methylcoumarin, 350 ml isopropanol, 120 ml dimethylsulfoxide, 5.7 g KOH, 1.0 g KI and 3-(3'-chloropropyl)-1,1,1,3,5,5,5-heptamethyltrisiloxane, 29.9 g, was heated at reflux for 24 hrs. The reaction mixture was then concentrated by removing solvents at reduced pressure and the concentrate was washed with a mixture of water and diethyl ether. The ether phase was devolatilized to yield 32.3 g of an oil having the average formula $Me_3SiO(MeLSiO)_2SiMe_3$, where L denotes the 3-(4-methylcoumarinoxy)propyl radical, and an $^1$H-NMR spectrum showing 0.2ppm(s) for $SiCH_3$, (8H) and 2.4ppm(s) for $CH_{,,}$ (2H).

A mixture of 2.0 g (2.8 mmols) $Me_3SiO(MeLSiO)_2SiMe_3$, where L denotes the 3-(4-methylcoumarinoxy)-propyl radical, 6.24 g (67 mmols) of $(Me_2SiO)_5$, 5.4 g (90 mmols) $(MeHSiO)_4$ and 0.1 g $CF_3SO_3H$ was heated at 80° for 48 hrs, after which it was stirred with 0.25 g of a 50/50 mixture of $NaHCO_3$/diatomaceous earth and then filtered to provide 9.0 g of a colorless oil of this invention having the average formula $Me_3SiO(Me_2SiO)_{30}(MeHSiO)_{32}(MeLSiO)_2SiMe_3$, where L has the meaning noted above.

EXAMPLE 4

A coating composition of this invention was prepared as disclosed in Example 2 except using 0.58 g of $Me_3SiO(Me_2SiO)_{30}(MeHSiO)_{32}(MeLSiO)_2SiMe_3$ instead of 0.38 g of $LMe_2SiO(Me_2SiO)_{17}(MeHSiO)_{54}SiMe_2L$, where L denotes the 3-(4-methylcoumarinoxy)propyl radical. The coating composition of this invention was applied to 37 lb Nicolet supercalendered kraft paper using a laboratory trailing blade coater adjusted to 30 psi blade pressure. The coated paper was heated in a forced air oven for 60 sec at 182° to fully cure the coating. The cured coating exhibited a light blue fluorescence when viewed under black light. When evaluated, using the process described in Example 2, the coating composition of this example provided a release force of 30 g/in.

EXAMPLE 5

A mixture of 6.35 g (29 mmols) $(CH_3CH_2)_3SiCH_2CH_2NH_2$; 7.55 g (41 mmols) $ViMe_2SiOSiMe_2Vi$; 31.88g (86 mmols) $(Me_2SiO)_5$; 4 mg KOH and 45 mg $H_2O$ was heated at 142° for 1.5 hrs, after which it was cooled to 100° and 2.35 g of water were added. The reaction mixture was then heated at 142° for 2.5 hrs under a nitrogen sweep, then cooled and neutralized with 0.10 g acetic acid. The neutralized mixture was then devolatilized at 50°/5 torr. The $^1$H-NMR spectrum of the residue and the stoichiometry and chemistry of the reaction mixture supported an average formula of (ViMe$_2$SiO$_{1/2}$)$_2$(Me$_2$SiO)$_{23}$(H$_2$NCH$_2$CH$_2$CH$_2$SiO$_{3/2}$). This residue was dissolved in 75 ml of toluene and 3.11 g (37 mmols) of NaHCO$_3$ was added. Dansyl chloride, 5.0 g (18.5 mmols), was added to the mixture and the mixture was heated at 80° for 2.5 hrs. The reaction mixture was then washed with 5% aqueous NaHCO$_3$ and then with H$_2$O. The organic layer was dried with MgSO$_4$ and the toluene was removed to leave a colorless oil, the $^1$H-NMR spectrum of which showed 0.2 ppm for for SiCH$_3$, 3.0 ppm for N(CH$_3$)$_2$, 5.9-6.1 ppm for SiCH=CH$_2$, and 7.0-7.9 ppm for aromatic hydrogen. Based on the above information the oil was assigned an average formula of (ViMe$_2$SiO$_{1/2}$)$_2$(Me$_2$SiO)$_{23}$(LSiO$_{3/2}$)$_1$, where L denotes the N-dansyl-3-aminopropyl radical.

EXAMPLES 6-8

Three coating composition were prepared by mixing the fluorescent organopolysiloxane compound of Example 5 with with components selected from the platinum-containing curing catalyst, the platinum catalyst inhibitor, the vinyl-terminated dimethyl-co-methyl-vinylpolysiloxane, and the organohydrogenpolysiloxane crosslinking agent noted in Example 2. See Table I for the make-up of each composition.

The coating compositions of this invention were applied to 37 lb Nicolet supercalendered kraft paper using a laboratory trailing blade coater adjusted to 30 psi blade pressure and the coated papers were heated in a forced air oven to cure the coating. The cured coatings exhibited a blue-green fluorescence when viewed under black light.

The coated papers were aged for 1 or 7 days, coated with a solution of acrylic pressure sensitive adhesive, the solution was dried and the dried adhesive was brought into contact with Mylar brand polyester tape to provide a releaseable laminate. The laminates were aged for 30 days at room temperature and the aged laminates was prepared for adhesive release testing, using ASTM methods. The aged laminates were pulled apart at a speed of 400 in/min; release force is recorded in Table I. A comparison laminate, prepared identically as the laminates of this invention except using the comparison composition of Example 2 exhibited a release force of 15-20 g/in.

This example demonstrates the utility of the compositions of this invention as a fluorescing adhesive release coating which provides undiminished adhesive releasing ability.

TABLE I

| Component | Example 6 | Example 7 | Example 8 |
|---|---|---|---|
| | Amount, parts | | |
| Platinum Catalyst | 9.1 | 18.4 | 18.5 |
| Catalyst Inhibitor | — | — | 10.5 |
| Organohydrogen-polysiloxane | 35.5 | 40.1 | 31.2 |
| Vinyl-terminated dimethyl-co-methyl-vinylpolysiloxane | — | 785.4 | 932.5 |
| (ViMe$_2$SiO$_{\frac{1}{2}}$)$_2$(Me$_2$SiO)$_{23}$(LSiO$_{3/2}$)$_1$ | 491.7 | 197.4 | 49.1 |
| Property | Observed Value | | |
| Cure Profile*, °C./sec | No cure | 177/40 | 163/60 |
| Release, g/in. | | | |
| 1 day old paper | — | 75 | 15 |

TABLE I-continued

| | Example 6 | Example 7 | Example 8 |
|---|---|---|---|
| 7 day old paper | — | 25 | 15 |

*Control = 93/50, 121/10.

EXAMPLE 9

A mixture of 0.18 g potassium silanolate (neutral equivalent 1375 gK+), 2.78 g H$_2$NCH$_2$CH$_2$CH$_2$(Me)SiO$_{2/2}$, and 97.22 g of ViMe$_2$SiO(Me$_2$SiO)$_{160}$(MeViSiO)$_3$SiMe$_2$Vi was heated at 140° for 5 hrs, after which it is cooled, neutralized with glacial acetic acid and filtered through a pressure filter containing celite. The filtrate was a clear fluid having an amine neutral equivalent of 4058 g/NH$_2$. The stoichiometry and chemistry of the reaction mixture supports an average formula for the reaction product of

Fifty grams of this aminofunctional silicone fluid was dissolved in 50 ml of toluene and 2.27 g of NaHCO$_3$ was added. Dansyl chloride, 3.65 g, was added to the mixture and the mixture was heated at 80° for 4 hrs. The reaction mixture was then washed with 5% aqueous NaHCO$_3$ and then with H$_2$O. The organic layer was taken into pentane, the pentane phase was dried with MgSO$_4$ and the pentane was removed to leave a yellow viscous fluid. The product was assigned the formula ViMe$_2$SiO(Me$_2$SiO)$_{160}$(LMeSiO)$_3$(MeViSiO)$_3$SiMe$_2$Vi, where L denotes the Me$_2$NC$_{10}$H$_6$SO$_2$NHCH$_2$CH$_2$CH$_2$— radical.

EXAMPLES 10-12

Three hazy coating compositions of this invention were prepared by mixing various amounts of the fluorescent organopolysiloxane compound of Example 9 with 1.85 parts of the platinum-containing curing catalyst, 1.05 parts of the platinum catalyst inhibitor, various amounts of the vinyl-terminated dimethyl-co-methyl-vinylpolysiloxane, and 3.70 parts of the organohydrogenpolysiloxane crosslinking agent noted in Example 2. See Table II for the make-up of each composition.

The resulting coating compositions of this invention were applied to 37 lb Nicolet supercalendered kraft paper using a laboratory trailing blade coater adjusted to 30 psi blade pressure and the coated papers were heated in a forced air oven at various temperatures to cure the coating. The cured coating exhibited a blue-green fluorescence when viewed under black light.

A control coating compositions was prepared by mixing 1.85 parts of the platinum-containing curing catalyst, 1.05 parts of the platinum catalyst inhibitor, 97.10 parts of the vinyl-terminated dimethyl-co-methyl-vinylpolysiloxane, and 3.70 parts of the organohydrogenpolysiloxane crosslinking agent noted in Example 2. This composition displayed a cure time of 10 seconds at 121° and 50 seconds at 93°.

TABLE II

| | Example 10 | Example 11 | Example 12 |
|---|---|---|---|
| Component | Amount, parts | | |
| Vinyl-terminated dimethyl-co-methyl-vinylpolysiloxane | 96.96 | 96.06 | 89.04 |
| Example 9 | 0.95 | 1.90 | 9.50 |

TABLE II-continued

| Property | Example 10 | Example 11 | Example 12 |
|---|---|---|---|
| | | Observed Value | |
| Cure Profile*, °C./sec | 93/100 | 93/140 | — |
| Cure Profile*, °C./sec | 121/15 | 121/15 | 121/40 |

*Control = 93/50, 121/10.

EXAMPLE 13

A mixture of 0.18 g potassium silanolate (neutral equivalent 1375 g/K+), 0.94 g $H_2NCH_2CH_2CH_2(Me)SiO_{2/2}$, and 99.06 g of $ViMe_2SiO(Me_2SiO)_{160}(MeViSiO)_3SiMe_2Vi$ was heated at 140° for 6 hrs, after which it is cooled, neutralized with glacial acetic acid and filtered through a pressure filter containing celite. The stoichiometry and chemistry of the reaction mixture supports an average formula for the reaction product of

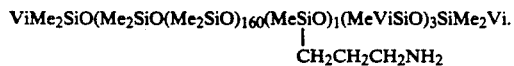

$$ViMe_2SiO(Me_2SiO(Me_2SiO)_{160}(MeSiO)_1(MeViSiO)_3SiMe_2Vi.$$
$$| $$
$$CH_2CH_2CH_2NH_2$$

Fifty grams of this aminofunctional silicone fluid was dissolved in 50 ml of toluene and 0.74 g of $NaHCO_3$ was added. Dansyl chloride, 1.19 g dissolved in 10 ml of toluene, was added to the mixture and the mixture was heated at 80° for 5 hrs. The reaction mixture was filtered through a glass frit containing celite and the filtrate was devolatilized at 95° and 2 torr to provide a light yellow viscous fluid which exhibited a strong fluorescence when exposed to ultraviolet light. The product was assigned the formula $ViMe_2SiO(Me_2SiO)_{160}(LMeSiO)_1(MeViSiO)_3SiMe_2Vi$, where L denotes the $Me_2NC_{10}H_6SO_2NHCH_2CH_2CH_2—$ radical.

EXAMPLES 14-16

Three clear coating compositions of this invention were prepared by mixing various amounts of the fluorescent organopolysiloxane compound of Example 13 with 1.85 parts of the platinum-containing curing catalyst, 1.05 parts of the platinum catalyst inhibitor, various amounts of the vinyl-terminated dimethyl-co-methylvinylpolysiloxane, and 3.70 parts of the organohydrogenpolysiloxane crosslinking agent noted in Example 2. See Table III for the make-up of each composition.

The resulting coating compositions of this invention were applied to 37 lb Nicolet supercalendered kraft paper using a laboratory trailing blade coater adjusted to 30 psi blade pressure and the coated papers were heated in a forced air oven at various temperatures to cure the coating. The cured coating exhibited a blue-green fluorescence when viewed under black light.

TABLE III

| Component | Example 14 | Example 15 | Example 16 |
|---|---|---|---|
| | | Amount, parts | |
| Vinyl-terminated dimethyl-co-methyl-vinylpolysiloxan | 95.19 | 92.54 | 71.39 |
| Example 13 | 2.72 | 5.44 | 27.20 |
| Property | | Observed Value | |
| Cure Profile*, °C./sec | 93/100 | 93/180 | — |
| Cure Profile*, °C./sec | 121/15 | 121/20 | 121/>120 |
| Cure Profile*, °C./sec | — | — | 149/30 |

*Control = 93/50, 121/10.

EXAMPLES 17-19

Three coating composition were prepared by mixing the fluorescent organopolysiloxane compound of Example 5 with components selected from the platinum-containing curing catalyst, the platinum catalyst inhibitor, the vinyl-terminated dimethyl-co-methylvinylpolysiloxane, and the organohydrogenpolysiloxane crosslinking agent noted in Example 2. See Table IV for the make-up of each composition.

The coating compositions of this invention were applied to 37 lb Nicolet RL 250 paper using a laboratory trailing blade coater adjusted to either 35 psi or 16 psi blade pressure, to provide coating weights of 0.58 lbs/3000 ft$^2$ and 1.13 lbs/3000 ft$^2$, respectively, and the coated papers were heated 149° for 60 seconds in a forced air oven to fully cure the coating.

The cured coatings were exposed to 345 nm ultraviolet light at an incidence angle of 45° to the coating and fluorescence at 465 nm was detected at an angle of 90° to the incident radiation, as taught in U.S. Pat. No. 4,250,382. The fluorescence readings were normalized and are noted in Table IV. Note that the amount of fluorescence that was measured from the cured coating was directly related to the amount of fluorescent compound of this invention present in the coating and to the thickness of the cured coating.

This example demonstrates the utility of the compounds and compositions of this invention for measuring coating thickness by measuring coating fluorescence.

TABLE IV

| Component | Example 17 | Example 18 | Example 19 |
|---|---|---|---|
| | | Amount, parts | |
| Platinum Catalyst | 18.5 | 18.5 | 18.5 |
| Catalyst Inhibitor | 10.5 | 10.5 | 10.5 |
| Organohydrogen-polysiloxane | 33.0 | 33.2 | 35.1 |
| Vinyl-terminated dimethyl-co-methyl-vinylpolysiloxane | 966.1 | 961.2 | 932.5 |
| Organopolysiloxane of Example 5 | 4.9 | 9.8 | 49.1 |
| Property | | Observed Value | |
| Fluorescence*, 465 nm | | | |
| Blade Pressure = 35 psi | 0.09 | 0.15 | 0.52 |
| Blade Pressure = 16 psi | 0.17 | 0.23 | 1.00 |

*Control = 0.00

That which is claimed is:

1. An organopolysiloxane compound having the empirical formula $R_aX_bL_cZ_dSiO_{(4-a-b-c-d)/2}$ wherein, at each occurrence,
   R denotes a silicon-bonded monovalent hydrocarbon or halogenated hydrocarbon radical free of aliphatic unsaturation.
   X denotes a silicon-bonded reactive site selected from the group consisting of the hydrogen atom and olefinic hydrocarbon radicals,
   L denotes a silicon-bonded monovalent organic radical containing a fluorescent nucleus selected from the group consisting of the dansyl nucleus and the methylcoumarin nucleus,
   Z denotes a silicon-bonded hydrolyzable radical, there being an average of at least two X reactive sites and at least one L radical per molecule of said compound and the sum of the subscripts a+b+c+d has a value of from one to 2.67.

2. An organopolysiloxane compound according to claim 1 wherein L denotes —R$^1$OC$_{10}$H$_7$O$_2$ wherein —R$^1$ denotes a divalent hydrocarbon radical and C$_{10}$H$_7$O$_2$ denotes a methylcoumarin nucleus.

3. An organopolysiloxane compound according to claim 1 wherein L denotes —R$^2$So$_2$C$_{10}$H$_6$N(CH$_3$)$_2$ wherein —R$^2$ denotes a divalent amine-containing radical and SO$_2$C$_{10}$H$_6$N(CH$_3$)$_2$ denotes a dansyl nucleus.

4. An organopolysiloxane compound according to claim 1 having the formula ViMe$_2$SiO(Me$_2$SiO)Me$_2$SiO)$_x$(LSiO$_{3/2}$)$_y$SiMe$_2$Vi wherein X has an average value of 23 and y has an average value of one, Me denotes the methyl radical, Vi denotes the vinyl radical and L denotes a silicon-bonded monovalent organic radical derived from the reaction of dansyl chloride with a silicon-bonded amine-containing radical having the formula —CH$_2$CH$_2$CH$_2$HN$_2$.

5. An organopolysiloxane compound according to claim 1 having the formula

YMe$_2$SiO(Me$_2$SiO)$_x$(MeLSiO)$_z$SiMe$_2$Y wherein Me denotes the methyl radical, X denotes a silicon-bonded reactive site selected from the group consisting of the hydrogen atom and olefinic hydrocarbon radicals, L denotes a silicon-bonded monovalent organic radical containing a fluorescent nucleus selected from the group consisting of the dansyl nucleus and the methylcoumarin nucleus, each Y denotes, independently, a radical selected from the group consisting of R, X, L and Z radicals and the sum of x+y+z has a value of at least one.

6. AN organopolysiloxane compound according to claim 5 wherein X denotes H and L denotes —R$^1$OC$_{10}$H$_7$O$_2$ denotes a methylcoumarin nucleus.

7. An organopolysiloxane compound according to claim 5 wherein X denotes an olefinic hydrocarbon radical and L denotes —R$^2$SO$_2$C$_{10}$H$_6$N(CH$_3$)$_2$ wherein —R$^2$ denotes a divalent amine-containing radical and SO$_2$C$_{10}$H$_6$N(CH$_3$)$_2$ denotes a dansyl nucleus.

8. An organopolysiloxane compound according to claim 5 having the formula

ViMe$_2$SiO(Me$_2$SiO)$_{160}$(MeLSiO)$_y$(MeViSiO)$_3$SiMe$_2$Vi wherein Me denotes the methyl radical, L denotes a silicon-bonded monovalent organic radical derived from the reaction of dansyl chloride with a silicon-bonded amine-containing radical having the formula —CH$_2$CH$_2$CH$_2$NH$_2$ and y has a value of from 1 to 3.

9. An organopolysiloxane compound according to claim 5 having the formula LMe$_2$SiO(Me$_2$SiO)$_{17}$(MeHSi))$_{54}$SiMe$_2$L wherein Me denotes the methyl radical and L denotes —Ch$_2$CH$_2$CH$_2$OC$_{10}$H$_8$O$_2$.

10. An organopolysiloxane compound according to claim 5 having the formula Me$_3$SiO(Me$_2$SiO)$_{30}$(MeHSiO)$_{32}$(MeLSiO)$_2$SiMe$_3$ wherein Me denotes the methyl radical and L denotes —CH$_2$Ch$_2$CH$_2$OC$_{10}$H$_8$O$_2$.

* * * * *